United States Patent
Dooley et al.

(10) Patent No.: US 6,525,689 B2
(45) Date of Patent: Feb. 25, 2003

(54) METHOD OF DESPREADING GPS SPREAD SPECTRUM SIGNALS

(75) Inventors: Saul R. Dooley, Reigate (GB); Andrew T. Yule, Felbridge (GB)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/862,291

(22) Filed: May 22, 2001

(65) Prior Publication Data

US 2002/0001339 A1 Jan. 3, 2002

(30) Foreign Application Priority Data

May 31, 2000 (GB) .............................. 0013148

(51) Int. Cl.[7] .............................. H04B 7/185; G01S 5/02
(52) U.S. Cl. .............................. 342/357.09; 342/357.1; 342/357.12; 701/213
(58) Field of Search .............................. 342/357.1, 357.09, 342/357.12; 701/213

(56) References Cited

U.S. PATENT DOCUMENTS

| 5,663,734 A | 9/1997 | Krasner | 342/357 |
| 5,841,396 A | 11/1998 | Krasner | 342/357 |
| 5,874,914 A | 2/1999 | Krasner | 342/357 |

FOREIGN PATENT DOCUMENTS

| EP | 0902300 A2 | 3/1999 | G01S/5/14 |
| WO | WO9919743 | 4/1999 | G01S/5/14 |
| WO | WO0010028 | 2/2000 | G01S/5/00 |

*Primary Examiner*—Theodore M. Blum
(74) *Attorney, Agent, or Firm*—Jack D. Slobod; Dicran Halajian

(57) ABSTRACT

A method of despreading a GPS spread spectrum signal received at a mobile unit MS1 with assistance from a base station BS1 includes (a) receiving and despreading GPS signals at the base station and deriving GPS signal information therefrom; (b) estimating the location of the mobile unit; (c) modifying the OPS signal information so as reflect the GPS signal characteristics as would be observed at the estimated location of the mobile unit; (d) transmitting the GPS signal information from the base station to the mobile unit; (e) generating replica signals containing PRN codes corresponding to those of the GPS signal using the modified GPS signal information; and (f) performing a correlation of the GPS signal and the replica signals in order to acquire the GPS signal.

10 Claims, 2 Drawing Sheets

METHOD OF DESPREADING GPS SPREAD SPECTRUM SIGNALS

FIELD OF THE INVENTION

This invention relates to a method of despreading a GPS spread spectrum signal received at a mobile unit with assistance from a base station.

BACKGROUND OF THE INVENTION

It is well known to provide a GPS receiver in which replica GPS satellite pseudorandom noise (PRN) code signals are continuous generated and correlated with received GPS signals in order to acquire them. Typically, as the replica codes are likely to have a different code phase to those of the received GPS signals and also a different frequency due to Doppler shift between the receiver and orbiting satellites, a two dimensional code frequency/phase sweep is employed whereby such a sweep will eventually result in the incoming PRN code having the same frequency and code phase as that of the locally generated replica. If detected, the code is acquired and tracked, and the pseudo-range information may be retrieved from which the position of the receiver may be calculated using conventional navigation algorithms.

It is further known to provide a mobile cellular telephone incorporating such a GPS receiver for the purpose of enabling operators of cellular telephone networks to determine the location from which a call is made and, in particular, for an emergency call to the emergency services. Of course for an emergency call, it is desirable for the call location to be available as soon as possible, however, from a "cold start" where the GPS receiver does not have access to up to date ephemeris data or even worse from a "factory cold start" where the GPS receiver does not have an up to date almanac, the time to first fix (TTFF) can be anywhere between 30 seconds and 5 minutes.

In order to reduce the TTFF, a GPS receiver may be provided with base station assistance in order to acquire GPS signals more quickly. Such assistance may include the provision by the base station to the receiver of a precision carrier frequency reference signal for calibrating the local oscillator used in the GPS receiver and, as obtained by the base station, the data message for up to date satellite almanac and ephemeris data from which Doppler shift for satellites in view can be determined together with the current PRN code phase. With such assistance, it is possible to sweep only a narrowed range of frequencies and code phases in which the GPS PRN code is known to occupy, thereby reducing the number of code instances that need to be checked and thus reducing the time for code acquisition. Base station assistance is further described in U.S. Pat. Nos. 5,841,396 and 5,874,914 which are incorporated herein by reference.

SUMMARY OF THE INVENTION

It is an object of the present invention to provide an improved method of despreading a GPS spread spectrum signal received at a mobile unit with assistance from a base station with which the TTFF may be reduced.

According to the present invention, there is provided such a method comprising the steps of:

(a) receiving and despreading GPS signals at the base station and deriving GPS signal information therefrom, ideally including Doppler and code phase information;

(b) estimating the location of the mobile unit;

(c) modifying the GPS signal information so as reflect the GPS signal characteristics as would be observed at the estimated location of the mobile unit;

(d) transmitting the GPS signal information from the base station to the mobile unit;

(e) generating replica signals containing PRN codes corresponding to those of the GPS signal using the modified GPS signal information; and (f) performing a correlation of the GPS signal and the replica signals in order to acquire the GPS signal.

The method of the present invention enables a narrower range of frequencies and/or code phases in which the GPS PRN code is known to occupy to be identified. As such, fewer code instances need to be checked and the time for GPS signal acquisition and thus the TTFF may be reduced.

Step (c) may be done at the base station in which case the modified GPS signal information is transmitted from the base station to the mobile unit, i.e. step (c) is done before step (d). Where this is so, whilst it may be convenient for the base station to transmit the modified GPS signal information to the mobile unit using direct RF communication, transmitting the modified GPS signal information from the base station to the mobile unit is also intended to include indirect transmission such as via land lines or using repeater stations. Furthermore, the initial estimate of the location of the mobile unit may be determined in the mobile unit and transmitted to the base station.

Also, provided in accordance with the present invention the combination of a base station and a mobile unit for despreading a GPS spread spectrum signal received at a mobile unit with assistance from a base station; wherein the base station comprises a GPS receiver for receiving and despreading GPS signals at the base station and deriving GPS signal information therefrom, a processor arranged to modify the GPS signal information so as reflect the GPS signal characteristics as would be observed at an estimated location of the mobile unit; and a transmitter for transmitting the modified GPS signal information from the base station to the mobile unit; and wherein the mobile unit comprising a GPS receiver for receiving the GPS signal, a communications receiver for receiving GPS signal information from a base station; and a processor arranged to generate replica signals containing PRN codes corresponding to those of the GPS signal using the modified GPS signal information and perform a correlation of the GPS signal and the replica signals in order to acquire the GPS signal. In addition, a further combination is provided wherein the base station comprises a GPS receiver for receiving and despreading GPS signals at the base station and deriving GPS signal information therefrom, and a transmitter for transmitting the modified GPS signal information from the base station to the mobile unit; and wherein the mobile unit comprising a GPS receiver for receiving the GPS signal; a communications receiver for receiving GPS signal information from a base station; and a processor arranged to modify the GPS signal information so as reflect the GPS signal characteristics as would be observed at an estimated location of the mobile unit, generate replica signals containing PRN codes corresponding to those of the GPS signal using the modified GPS signal information and perform a correlation of the GPS signal and the replica signals in order to acquire the GPS signal.

Further provided in accordance with the present invention is a base station for providing such assistance comprising a GPS receiver for receiving and despreading GPS signals at the base station and deriving GPS signal information therefrom, a processor for modifying the GPS signal information so as reflect the GPS signal characteristics as would be observed at an estimated location of a mobile unit; and a transmitter for transmitting the modified GPS signal information from the base station to the mobile unit.

Yet further provided in accordance with the present invention is a mobile unit comprising a GPS receiver for receiving the GPS signal; a communications receiver for receiving GPS signal information from a base station; and a processor arranged to modify the GPS signal information so as reflect the GPS signal characteristics as would be observed at an estimated location of the mobile unit, generate replica signals containing PRN codes corresponding to those of the GPS signal using the modified GPS signal information and perform a correlation of the GPS signal and the replica signals in order to acquire the GPS signal

BRIEF DESCRIPTION OF THE DRAWINGS

The above and other features and advantages of the present invention will be apparent from the following description, by way of example, of an embodiment of a mobile cellular telephone comprising a GPS receiver for use in a cellular telephone network with reference to the accompanying drawings in which.

DETAILED DESCRIPTION OF THE INVENTION

Figure 1:
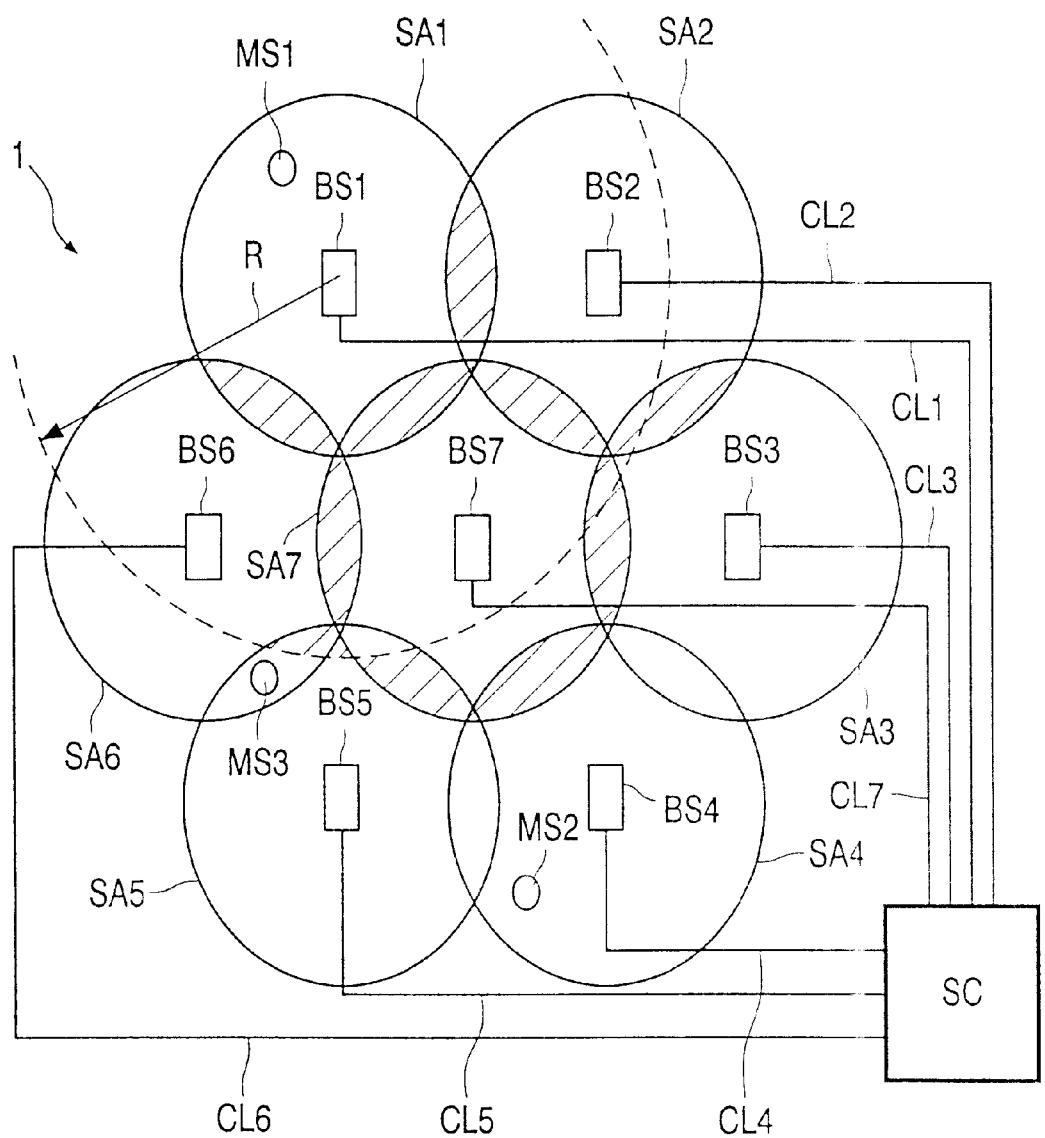
FIG. 1 shows, schematically, the geographic layout of a cellular telephone network.

The geographical layout of a conventional cellular telephone network 1 is shown schematically in FIG. 1. The network comprises a plurality of base stations BS of which seven, BS1 to BS7, are shown, situated at respective, mutually spaced geographic locations. Each of these base stations comprises the entirety of a radio transmitter and receiver operated by a trunking system controller at any one site or service area. The respective service areas SA1 to SA7 of these base stations overlap, as shown by the cross hatching, to collectively cover the whole region shown. The system may furthermore comprise a system controller SC provided with a two-way communication link, CL1 to CL7 respectively, to each base station BS1 to BS7. Each of these communication links may be, for example, a dedicated land-line. The system controller SC may, furthermore, be connected to a the public switched telephone network (PSTN) to enable communication to take place between a mobile cellular telephone MS1 and a subscriber to that network. A plurality of mobile cellular telephones MS are provided of which three, MS1, MS2 and MS3 are shown, each being able to roam freely throughout the whole region, and indeed outside it.

Figure 2:
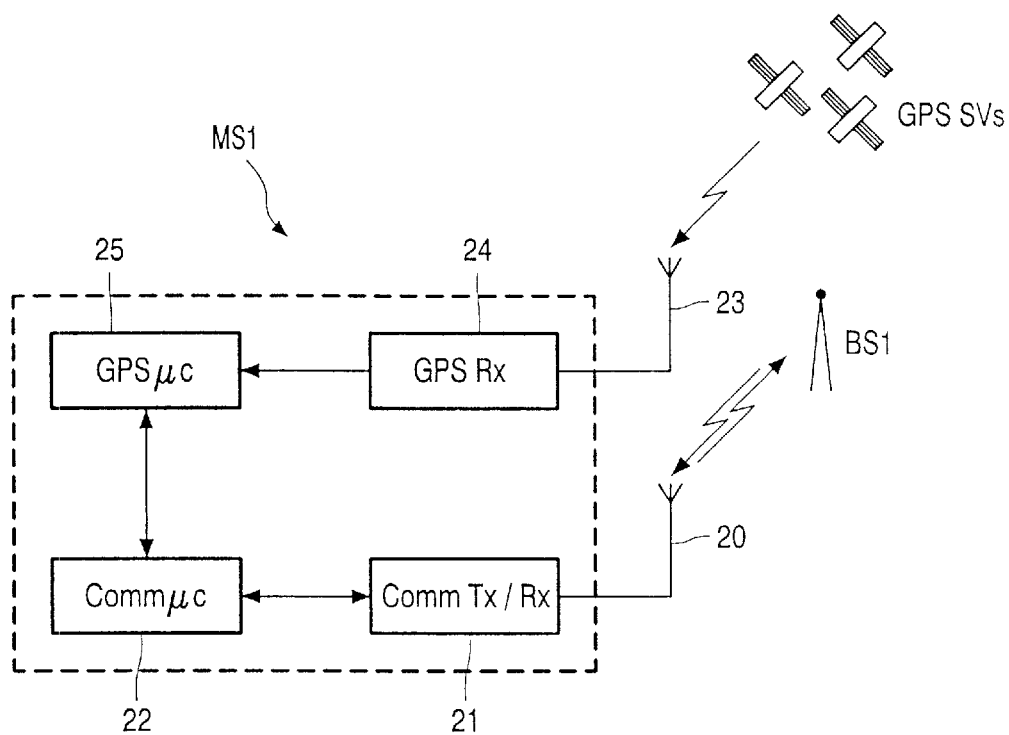
FIG. 2 shows, schematically, the mobile cellular telephone MS1 of FIG. 1 in greater detail.

Referring to FIG. 2, mobile cellular telephone MS1 is shown in greater detail comprising a communications transmitter (Comm Tx) and receiver (Comm Rx) 21 connected to a communications antenna 20 and controlled by a communications microprocessor (Comm μc) 22 for communication with the base station BS1 with which it is registered. The design and manufacturing of such telephones for two-way communication within a cellular telephone network are well known, those parts which do not form part of the present invention will not be elaborated upon here further.

In addition to the conventional components of a mobile telephone, telephone MS1 further comprises a GPS receiver (GPS Rx) 24 connected to a GPS antenna 23 and controlled by a GPS microprocessor (GPS μc) 25 receiving GPS spread spectrum signals transmitted from orbiting GPS satellites. When operative, the GPS receiver 24 may receive NAVSTAR SPS GPS signal through an antenna 23 and pre-process them, typically by passive bandpass filtering in order to minimise out-of-band RF interference, preamplification, down conversion to an intermediate frequency (IF) and analog to digital conversion. The resultant, digitised IF signal remains modulated, still containing all the information from the available satellites, and is fed into a memory of the GPS microprocessor 25. The GPS signals may then be are acquired and tracked for the purpose of deriving pseudorange information from which the position of the mobile telephone can be determined using conventional navigation algorithms. Such methods for GPS signal acquisition and tracking are well known, for example, see chapter 4 (GPS satellite signal characteristics) & chapter 5 (GPS satellite signal acquisition and tracking) of GPS Principles and Applications (Editor, Kaplan) ISBN 0-89006-793-7 Artech House. The GPS microprocessor 25 may be implemented in the form a general purpose microprocessor, optionally common with the communications microprocessor 22, or a microprocessor embedded in a GPS application specific integrated circuit (ASIC).

Figure 3:
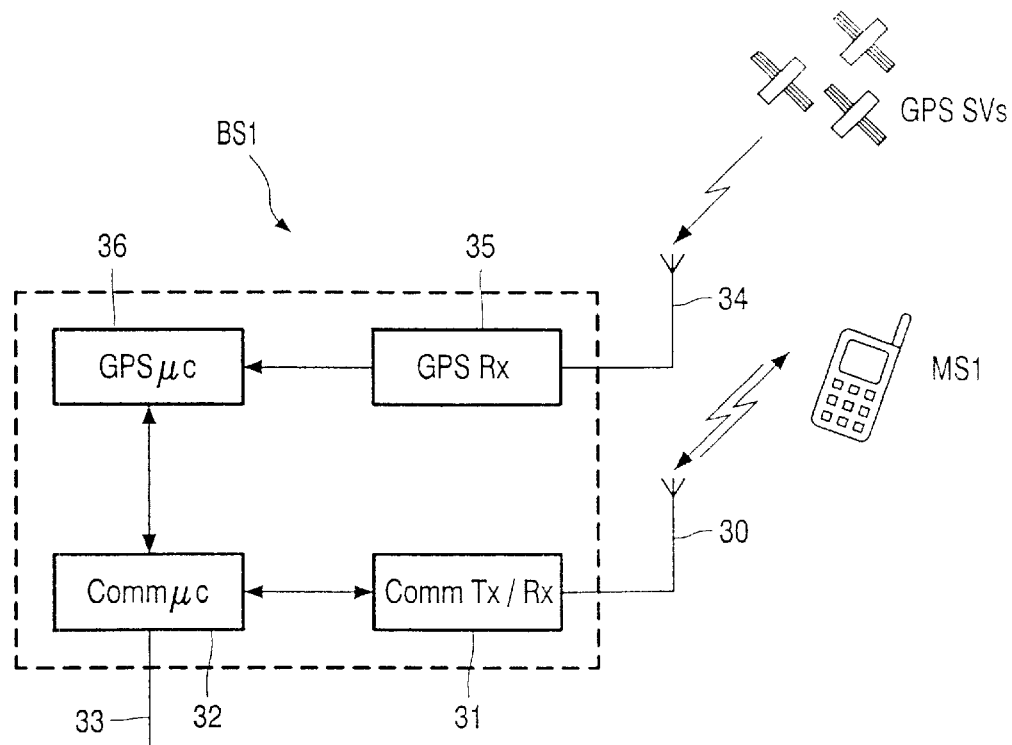
FIG. 3 shows, schematically, the base station BS1 of FIG. 1 in greater detail.

Cellular telephone network base station BS1 is shown schematically in FIG. 3. In additional to the conventional components of a base station, it further comprises a GPS antenna 34, receiver 35 and microprocessor 36 which are in substantially continual operation whereby the base station is in constant possession of up to date GPS satellite information. This information includes which of the orbiting satellites are presently in view (such satellites are likely to be common to both telephone and associated base station for even macrocells, obscuration aside); the GPS data message containing an up to date almanac and ephemeris data, and the Doppler shift and current code phase of the GPS satellites signals as observed by the base station. In accordance with the present invention, this information is modified so as to reflect the position of the mobile unit, i.e. to described the Doppler shift and code phase of the GPS signals as would be observed at the mobile unit. In the event of the user of the mobile cellular telephone MS1 making an emergency call and under the control of the system controller SC via a two-way communication link CL1, the base station BS1 may provide this modified information to the telephone whereby it is then only required to sweep a narrowed range of frequencies and code phases in which the GPS PRN code is known to occupy, ensuring rapid code acquisition and TTFF. The position of the mobile telephone is then transmitted to the base station from the telephone, and then on to the emergency services operator, termed the Public Safety Answer Point (PSAP) in the US.

In the above example, the base station which provides the assistance to the mobile telephone to despread the incoming signal is also the communications base station with which the mobile telephone communicates the emergency call and its position, i.e. that which it is registered with. Of course this need not be the case, the base station for providing assistance to despread the incoming signal may be a different base station to that with which the mobile telephone is registered, for example, where the assistance is provided by a dedicated unit serving more than network cell. In such a case, the base station providing the assistance will transmit the modified GPS signal information to the mobile telephone via the base station with which the mobile telephone is registered.

An example of a method of modifying the Doppler shift and current code phase of the GPS satellites signals as observed by the base station to reflect the position of the mobile unit is provided below.

If basestation BS1 is at position $\underline{b}=(X_b, Y_b, Z_b)$ and receives a GPS signal transmitted from a GPS satellite at position $\underline{s}=(X_s, Y_s, Z_s)$ travelling with velocity $\underline{v}=(X_v, Y_v, Z_v)$ then the theoretical Doppler shift $f_b$ on those signals as observed at base station BS1 transmitted from the satellite at the base station is:

$$f_b = \frac{F}{c} d_{sb} \cdot \underline{v} \qquad \text{[Equation 1]}$$

where F is the GPS signal carrier frequency (1575.42 MHz in the case of the NAVSTAR GPS L1 signal), c is the speed of light and $\underline{d}_{sb}$ is the unit direction vector of the satellite from the basestation given by:

$$\underline{d}_{sb} = \frac{\underline{s} - \underline{b}}{|\underline{s} - \underline{b}|} \qquad \text{[Equation 2]}$$

In practice various minor effects, including selective availability when operative, will cause the measured frequency $f'_b$ to be slightly different. This frequency offset $\partial f$ can be determined by the base station by:

$$\partial f = f'_b - \frac{F}{c} d_{sb} \cdot \underline{v} \qquad \text{[Equation 3]}$$

If mobile cellular telephone MS1 is at position $\underline{m}=(X_m, Y_m, Z_m)$, the base station may then supply a more accurate approximation to the Doppler shift at the mobile $f'_m$ given by:

$$f'_m = \partial f + \frac{F}{c} d_{sm} \cdot \underline{v} \qquad \text{[Equation 4]}$$

where $\underline{d}_{sm}$ is the unit direction vector of the satellite from the mobile given by:

$$d_{sm} = \frac{\underline{s} - \underline{m}}{|\underline{s} - \underline{m}|} \qquad \text{[Equation 5]}$$

Similarly for the code phase estimate, the theoretical code phase $cp_b$ as observed at the base station can be expressed as follows:

$$cp_b = \left( \frac{C|\underline{s} - \underline{b}|}{c} \right) \bmod L \qquad \text{[Equation 6]}$$

where C is the chipping rate of the GPS PRN code (1.023 MHz in the case of C/A code), c is the speed of light and L is the code length (1023 chips). Again, there will be a small deviation $\partial cp$ due to uncompensated range errors caused by atmospherics, selective availability etc., which can be determined at the basestation:

$$\partial cp = cp'_b - cp_b \qquad \text{[Equation 7]}$$

where $cp'_b$ is the measured code phase. Therefore, the expected code phase at the mobile can be estimated to be:

$$cp'_m = \partial cp + \left( \frac{C|\underline{s} - \underline{m}|}{c} \right) \bmod L \qquad \text{[Equation 8]}$$

An initial estimate of the position of a mobile unit may be provided in a variety of conventionally ways, for example, by retrieving a last known GPS derived position of the mobile unit from a memory store at the base station or at the mobile phone or elsewhere and supplied to the base station upon request. Alternatively, time of arrival, time difference of arrival and/or angle of arrival measurements may be made between the mobile unit and at least one base station, by either the mobile unit or the or each base station, from which an position estimate may be provided. A further alternative using a series of base stations is to estimate a position by providing an average or weighted average of the position of the base stations that a mobile unit can "see", i.e. those base stations which the mobile unit can detect signal transmissions from. A yet further alternative is to use an independent system such as dead-reckoning or map matching, especially where the mobile unit is vehicle based. As such methods of providing a position estimate are known, they will not be described here further.

As well as Doppler and code phase data for the satellites in view, the GPS signal information might also include other GPS SV information such as azimuth, elevation and signal strength data.

Also, as an alternative to the early-late correlation methods, fast convolution methods and in particular, involving Fast Fourier Transforms (FFTs), may be used in order to acquired the PRN codes. Such convolution methods are described in a paper entitled "FFT processing of direct sequence spreading codes using modern DSP microprocessors" by Robert G Davenport, IEEE 1991 National Aerospace and Electronics Conference NAECON 1991, volume 1, pages 98 to 105, and also in U.S. granted Pat. No. 5,663,734. The method of the present invention is equally is applicable such convolution methods.

At present GPS is most notably associated with the Navigation System with Time and Ranging (NAVSTAR) GPS, an all weather, spaced based navigation system developed and operated by the US Department of Defense, however, the general principles underlying GPS are universal and not merely limited to NAVSTAR. Accordingly, GPS refers to any positioning system comprising a plurality of CDMA radio transmitters at different locations and a receiver which determines its location based on the time of arrival of the transmissions of the radio transmitters.

From a reading of the present disclosure, other modifications will be apparent to the skilled person skilled and may involve other features which are already known in the design, manufacture and use of GPS receivers and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same problems as does the present invention. The applicants hereby give notice that new claims may be formulated to such features and/or combinations of such features during the prosecution of the present application or of any further application derived therefrom.

What is claimed is:

1. A method of despreading a GPS spread spectrum signal received at a mobile unit with assistance from a base station comprising the steps of:
   (a) receiving and despreading GPS signals at the base station and deriving GPS signal information therefrom;
   (b) estimating the location of the mobile unit;
   (c) modifying the GPS signal information so as reflect the GPS signal characteristics as would be observed at the estimated location of the mobile unit;
   (d) transmitting the GPS signal information from the base station to the mobile unit;
   (e) generating replica signals containing PRN codes corresponding to those of the GPS signal using the modified GPS signal information; and
   (f) performing a correlation of the GPS signal and the replica signals in order to acquire the GPS signal.

2. A method according to claim 1 wherein step (c) is done before step (d).

3. A method according to claim 2 wherein the initial estimate of the location of the mobile unit is determined in the mobile unit and transmitted to the base station.

4. A method according to claim 1 wherein the GPS signal information comprises Doppler information.

5. A method according to claim 1 wherein the GPS signal information comprises code phase information.

6. The combination of a base station (BS1) and a mobile unit (MS1) for despreading a GPS spread spectrum signal received at a mobile unit with assistance from a base station by a method according to claim 1.

7. The combination of a base station and a mobile unit for despreading a GPS spread spectrum signal received at a mobile unit with assistance from a base station; wherein the base station comprises a GPS receiver for receiving and despreading GPS signals at the base station and deriving GPS signal information therefrom, a processor arranged to modify the GPS signal information so as reflect the GPS signal characteristics as would be observed at an estimated location of the mobile unit; and a transmitter for transmitting the modified GPS signal information from the base station to the mobile unit; and wherein the mobile unit comprising a GPS receiver for receiving the GPS signal, a communications receiver for receiving GPS signal information from a base station; and a processor arranged to generate replica signals containing PRN codes corresponding to those of the GPS signal using the modified GPS signal information and perform a correlation of the GPS signal and the replica signals in order to acquire the GPS signal.

8. The combination of a base station (BS1) and a mobile unit (MS1) for despreading a GPS spread spectrum signal received at a mobile unit with assistance from a base station; wherein the base station comprises a GPS receiver (35) for receiving and despreading GPS signals at the base station and deriving GPS signal information therefrom, and a transmitter (31) for transmitting the modified GPS signal information from the base station to the mobile unit; and wherein the mobile unit comprising a GPS receiver (24) for receiving the GPS signal; a communications receiver (21) for receiving GPS signal information from a base station; and a processor (26) arranged to modify the GPS signal information so as reflect the GPS signal characteristics as would be observed at an estimated location of the mobile unit, generate replica signals containing PRN codes corresponding to those of the GPS signal using the modified GPS signal information and perform a correlation of the GPS signal and the replica signals in order to acquire the GPS signal.

9. A base station for providing assistance to a mobile unit for despreading GPS spread spectrum signals received at the mobile unit comprising a GPS receiver for receiving and despreading GPS signals at the base station and deriving GPS signal information therefrom, a processor arranged to modify the GPS signal information so as reflect the GPS signal characteristics as would be observed at an estimated location of the mobile unit; and a transmitter for transmitting the modified GPS signal information from the base station to the mobile unit.

10. A mobile unit for despreading a received GPS spread spectrum signal with assistance from a base station comprising a GPS receiver for receiving the GPS signal; a communications receiver for receiving GPS signal information from a base station; and a processor arranged to modify the GPS signal information so as reflect the GPS signal characteristics as would be observed at an estimated location of the mobile unit, generate replica signals containing PRN codes corresponding to those of the GPS signal using the modified GPS signal information and perform a correlation of the GPS signal and the replica signals in order to acquire the GPS signal.

* * * * *